F. M. DAVIS.
GEARING.
APPLICATION FILED MAY 24, 1920.

1,366,770.

Patented Jan. 25, 1921.

WITNESSES
O. E. Hyde
C. L. Naal

INVENTOR
Frank M. Davis
By R. S. Caldwell
ATTORNEY

UNITED STATES PATENT OFFICE.

FRANK M. DAVIS, OF MILWAUKEE, WISCONSIN.

GEARING.

1,366,770.                    Specification of Letters Patent.    Patented Jan. 25, 1921.

Application filed May 24, 1920. Serial No. 383,801.

*To all whom it may concern:*

Be it known that I, FRANK M. DAVIS, a citizen of the United States, and resident of Milwaukee, county of Milwaukee, and State of Wisconsin, have invented new and useful Improvements in Gearing, of which the following is a description, reference being had to the accompanying drawings, which are a part of this specification.

The invention relates to gearing.

The object of the invention is to provide a simple and effective means for taking up the back-lash on worm gearing and is particularly useful on machines where accurate work is done.

The invention further consists in the several features hereinafter set forth and more particularly defined by claims at the conclusion hereof.

Figure 1:
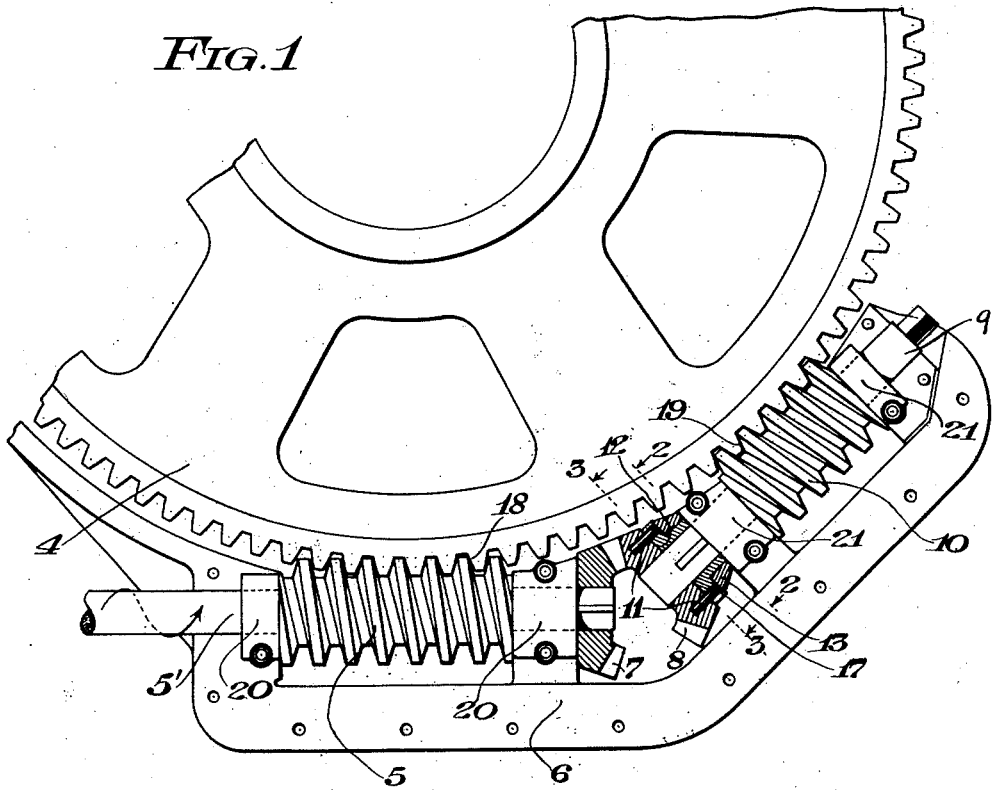
Figure 2:
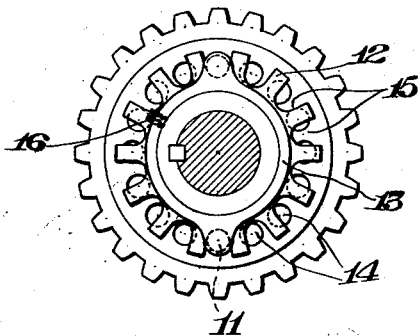
Figure 3:
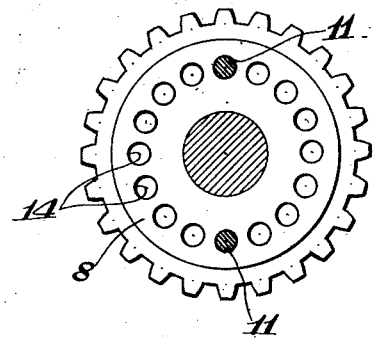
Figure 4:
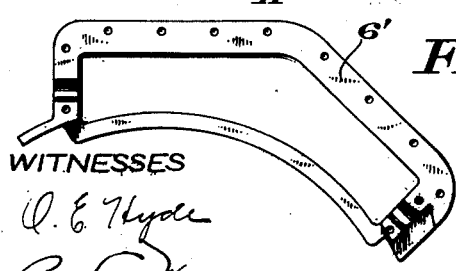

In the drawings: Figure 1 is a view of the device embodying the invention, parts being shown in section; Fig. 2 is a section taken on the line 2—2 of Fig. 1; Fig. 3 is a section taken on the line 3—3 of Fig. 1; Fig. 4 is a view of the cover for the gear case.

In the drawings, the numeral 4 designates a worm wheel meshing with a drive worm 5 on a shaft 5' which is journaled in a casing 6 having a removable cover 6' and carries a bevel gear 7.

The bevel gear 7 meshes with a bevel gear 8 loosely mounted on a shaft 9 carrying a "take up" worm 10 also meshing with the worm wheel 4. The shaft 5' is journaled in bearings 20 on the casing 6 and the shaft 9 in bearings 21 on said casing.

The shaft 9 is driven through the bevel gears 7 and 8, the gear 8 being drivingly connected to said shaft by means of pins 11, a spider 12 and a retainer 13 which connection permits of a relative rotary adjustment of the shaft 9 with respect to the shaft 5' so that the worm 10 may be secured in adjusted position to bear upon the opposite side of the teeth of the worm wheel from that of the driving worm. This connection is effected by providing a plurality of holes 14 in the gear 8 and a plurality of notches 15 in the spider so that the spider with the shaft 9 may be rotated to the desired adjusted position to bring the worm 10 into engagement with the opposite side of the teeth of the wheel from that against which the driving worm engages and be held in this position by the pins 11, the retainer 13 having lugs which may be disposed over the ends of the pins and when so set the retainer is secured in position by a set screw 16. The pins 11 have grooved ends 17 to permit of their ready removal.

With the construction above described the worm 5 in driving bears against one side of the teeth of the worm wheel as the side 18 while the worm 10, having been adjusted so that it bears on the opposite side of the teeth of worm wheel as the side 19, is driven by the worm 5 through the gears 7 and 8. Consequently the play or back-lash usually present in the ordinary worm gear is entirely taken up and as the gears wear down the wear is taken care of by a further adjustment of the worm 10. Other forms of adjustment than that shown may be used and the worm 10 while preferably engaging the wheel 4 could engage a similar worm wheel directly connected to or integral with the first worm wheel to take up the back-lash.

I desire it to be understood that this invention is not limited to any specific form or arrangement of parts except in so far as such limitations are specified in the claims.

What I claim as new and desire to secure by Letters Patent is:

1. The combination, with a worm and worm wheel, of a take-up worm meshing with said wheel and positively driven by the first named worm and bearing upon the opposite side of the teeth of the worm wheel from that of the driving worm, and means for adjusting said take-up worm to compensate for wear.

2. The combination, with a worm and worm wheel, of a second worm meshing with said wheel to take up back-lash, a positive gearing connection between the worms, and means for adjusting said second worm to compensate for wear.

3. The combination, with a worm and worm wheel, of a take-up worm operatively connected to said worm wheel to take up back-lash, means for positively driving both worms, and means for adjusting the take-up worm to compensate for wear.

4. The combination, with a worm and worm wheel, of a second worm meshing with said wheel to take up back-lash, a positive driving connection between the worms, and means permitting turning of said second worm relative to the wheel to an operative position and maintaining it in this position.

5. The combination, with a worm and worm wheel, of a second worm meshing with said wheel to take up back-lash, a positive gearing connection between the worms, and means for permitting turning of said second worm relative to the wheel to operative position and maintaining it in this position.

In testimony whereof, I affix my signature.

FRANK M. DAVIS.